Patented Mar. 24, 1931

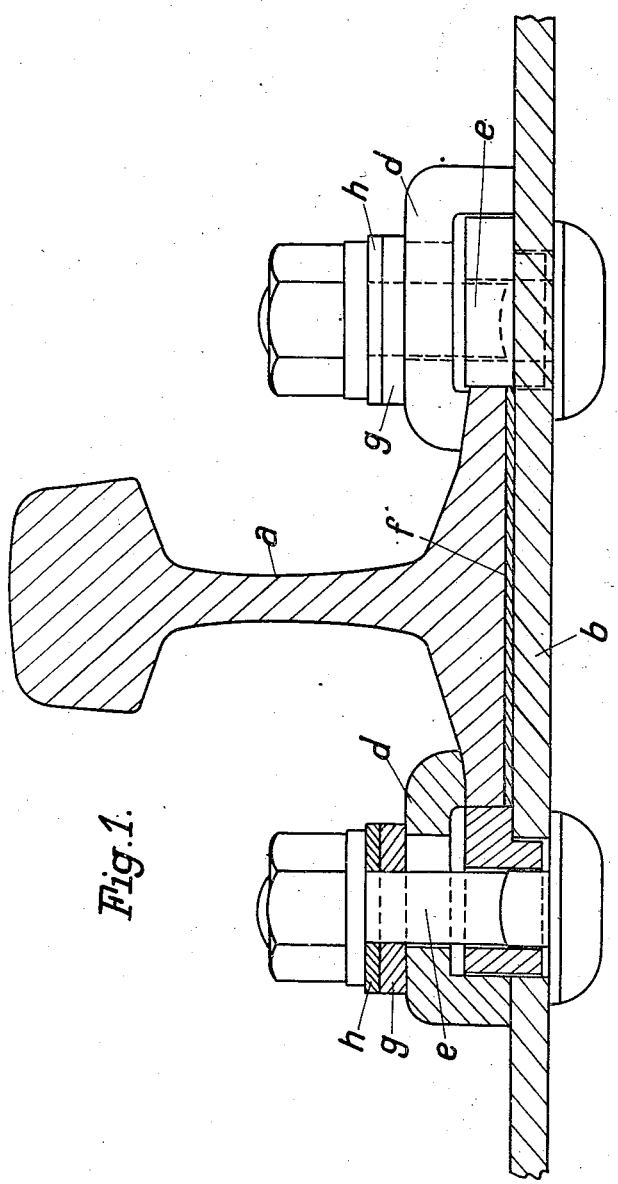

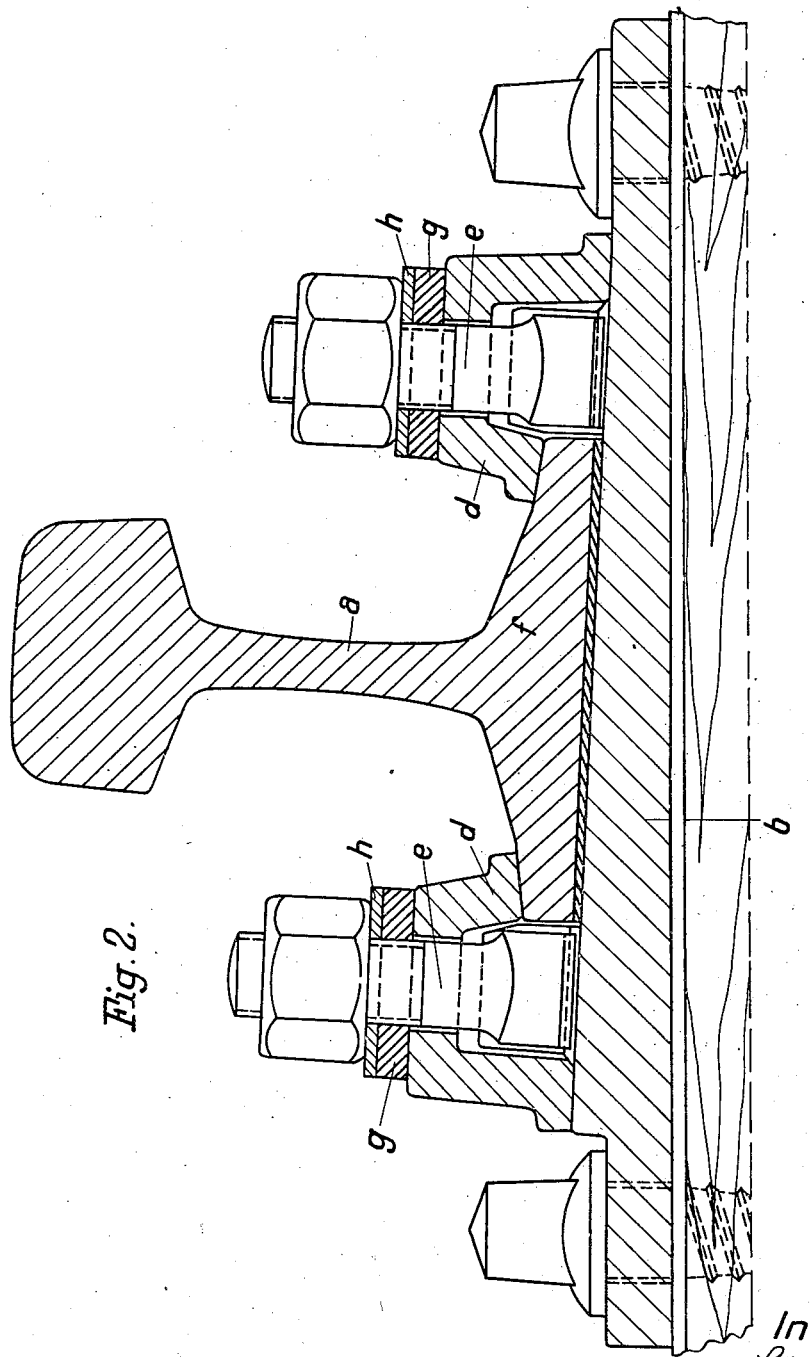

1,798,092

UNITED STATES PATENT OFFICE

CARL LÖSSL, OF GAUTING, NEAR MUNICH, GERMANY

RAIL-FASTENING MEANS

Application filed October 17, 1929, Serial No. 400,411, and in Germany September 5, 1929.

This invention relates to a rail fastening, in which the rail is firmly clamped on to iron sleepers or iron tie-plates by means of clamping clips and clamping clip screws.

It is of particular technical and economic importance to the permanent way that the initial pressure between the rail and its support should be permanently maintained. A loosened rail pressure promotes creeping of the rails and causes wear and noisy running. This increases the expense of maintaining the track, and makes travelling unpleasant and tiring to the passengers.

The loosening of the rail fastening means arises from insufficient friction between the screw-threads of the clamping clip fastening bolt and the associated nut. The vibrations of the bolt caused by passing trains tend to rotate the nut in such a direction as to loosen it.

Hence it is important, when tightening the nut, to produce the maximum friction possible in the thread, that is to say, the nut must be as firmly tightened as the strength of the bolt shank permits with the usual factor of safety. Furthermore it is necessary to maintain the friction between the screw-threads, produced by this maximum permissible initial stress, constantly of such magnitude that the said friction can reliably prevent rotation of the nut in the loosening direction.

Now owing to the hard blows of the wheel flanges against the inner tread surfaces of the rails, which are transmitted to the threads of the inner hook bolts, the initial stress, and therefore the friction in the thread, are reduced. The threads of the bolt and the nut never fit into one another so accurately, that all the turns of the thread are well bedded one in the other. Owing to the impact actions, the operative turns of the thread are too highly stressed, so that they yield, and thus the mutual pressure between the bearing surface of the nut and the clamping clip is weakened.

The initial stress is however further reduced by the fact that the loaded rail forces its way into its support. To the extent to which the rail is pressed into its support, the pressure in the thread is of course diminished and therefore also the initial stress. Hence if the linear indentation of the rail into its support is as great as or even greater than the linear indentation of the nut, tightened with the maximum permissible initial stress, into the co-acting surface of the clip plate, the relaxation of the clamping clip bolt is complete and the initial stress is entirely eliminated. Owing to the irregularities in the bearing surfaces arising from the rolling process, there is always the danger of a greater linear indentation of the rail.

An effective and permanent initial stress admits according to the invention of being produced if between the clamping clip and the nut of the clamping clip bolt and also between the rail and its iron support hard resilient intermediate layers are inserted of such dimensions that the linear indentations of the intermediate layer interposed between the clamping clip and the nut amount to a multiple of the indentations of the intermediate layer between the rail and its support. It is particularly advantageous for the intermediate layer under the nuts of the clamping clip bolts to be made about four times as thick as the intermediate layer under the rail.

As a hard resilient material for this purpose there may preferably be employed a cellulose product obtained under high pressure, which is mixed with a binding and water repelling filling substance. It is particularly advantageous to prepare the cellulose product from about 80 per cent. of pure cellulose and 20 per cent. of filling material, and to compress this product at a pressure of about 150 tons per square centimetre. Suitable filling materials are resin soap, animal size, sulphate of alumina, volcanic earth, and the like as binding materials, and mineral sperm oil, waterglass and gas black as water repelling substances. The filling substances are added to the cellulose pulp in such amounts that the pressed plates have the necessary homogeneous compactness while retaining their elasticity and extensibility. The material obtained in this manner is not only absolutely weatherproof but also shows no signs of fatigue even at the greatest loads.

The resilient means, such as double spring rings, spring washers and the like, hitherto employed between the nut of the clamping clip bolt and the clamping clip, cannot in any way solve the present problem. The double spring ring, when it is clamped with clearance in the turns of the spring, only yields a part of the maximum permissible initial stress, and this part in its turn yields too little friction to counteract reliably and permanently the tendency of vibrations to loosen the nut. If the turns of the spring are brought into close contact with one another, when the nut is tightened up, the nut can still be tightened a good way before the maximum permissible initial stress is attained. If, however, the clamping of the spring ring is effected in this manner, it acts like an iron tie-plate in the event of hard hammer blows on the rails, and the thread is no longer resiliently protected. From the moment when the turns of the spring, during the clamping, come into direct contact with one another, until the maximum permissible initial stress is attained, the linear compression of iron surface upon iron surface is almost unmeasurable, and the linear resilient indentation of the loaded rail then immediately reduces the initial stress to quite a considerable extent. Hence reliability of the initial stress is not given by using spring rings.

A rail fastening constructed according to the invention is illustrated in section in the accompanying drawings, in which Figure 1 shows the fastening of the rail to an iron sleeper, and Figure 2 the fastening of the rail to an iron tie-plate.

The rail $a$ is firmly clamped on to a sleeper or tie-plate $b$ by means of clip plates and hook bolts $e$. Between the rail foot and the iron sleeper or iron tie-plate is located a hard resilient intermediate layer $f$ about 2 millimetres in thickness, while between the nuts of the hook bolts $e$ and the clip plates $d$ are provided intermediate layers $g$ of the same material of about 8 millimetres in thickness. In order to prevent the nuts from working into the hard resilient material, a thin iron plate or washer $h$ is also provided.

If the linear resilient compressions of the material are taken as proportional to the product of the compression pressures and the thicknesses of the material, the following stress ratios are obtained:—

Assuming that the diameter of the hook bolt is 19 millimetres in the thread and the permissible tensile stress is 1000 kilogrammes per square centimetre, which for the tensile strength of the bolt involves a factor of safety of between 5 and 6, the nut should be tightened up to a total surface pressure in the thread or between the under surface of the nut and the clip plate of 2850 kilogrammes. The annular surface of the hard resilient disc $g$ amounts to about 14.7 square centimetres, so that the pressure of the disc comes out to about 200 kilogrammes per square centimetre. If the pressure of the rail foot upon its support is dimensioned at about four-fifths of the maximum wheel pressure, that is, at 10,000 kilogrammes, with a bearing area of the rail foot of 200 square centimetres, the pressure of the plate amounts to about 50 kilogrammes per square centimetre.

The linear elastic compression of the 2 mm. elastic plate will have the following ratio to the linear elastic compression of the 8 mm. intermediate layer $g$, during the moments when the load is on the rail:

$$\frac{Z}{X} = \frac{50 \times 2}{200 \times 8} = \frac{1}{16}$$

Z being the plate and X being the intermediate layer.

The relief on the hook bolt at the moment when the rail is loaded in therefore only one-sixteenth of the original tension.

If the ratio of the thicknesses of the elastic parts were 1:3, the stress ratio would be $$\frac{50 \times 1}{200 \times 3} = \frac{1}{12}$$

If it were 1:2, the stress ratio would be $$\frac{50 \times 1}{200 \times 2} = \frac{1}{8}$$

If it were 1:1, the stress ratio would be $$\frac{50}{200} = \frac{1}{4}$$

With a fully loaded rail, the reserve of tension in the hook bolt is as follows:—

With a ratio of thickness 1:1, 3/4=75% of the original tension=ca. 2100 kg.
With a ratio of thickness 1:2, 7/8=87.5% of the original tension=ca. 2500 kg.
With a ratio of thickness 1:3, 11/12=95.5% of the original tension=ca. 2600 kg.
With a ratio of thickness 1:4, 15/16=93.5% of the original tension=ca. 2700 kg.

It will thus be seen that it is of advantage to choose the thickness of the elastic parts so that the ratio of the elastic compressions is as high as possible.

With the arrangement and construction of the intermediate layer according to the invention there is therefore a guarantee that loosening of the fastening means will be prevented.

What I claim is:—

1. Means for fastening a rail to an iron support such as a sleeper, comprising clamping clips, clamping clip bolts, nuts screwing on to the clamping clip bolts, a hard resilient intermediate layer interposed between the rail and its iron support, and hard resilient intermediate layers interposed between the clamping clips and the nuts screwing on to the clamping clip bolts, the said intermediate layers being of such thicknesses that the linear indentations of the layers interposed between the clamping clips and the nuts amount to a multiple of the linear indentations of the layer interposed between the rail and its support.

2. Means for fastening a rail to an iron support such as a sleeper, comprising clamping clips, clamping clip bolts, nuts screwing on to the clamping clip bolts, a hard resilient intermediate layer interposed between the rail and its iron support, and hard resilient intermediate layers interposed between the clamping clips and the nuts screwing on to the clamping clip bolts, the intermediate layers interposed between the clamping clips and the nuts being about four times as thick as the intermediate layer interposed between the rail and its support.

3. Means for fastening a rail to an iron support as claimed in claim 1, the said intermediate layers consisting of a cellulose product obtained under high pressure and containing about 80 per cent. of pure cellulose and about 20 per cent. of a binding and water-repelling filler.

4. Means for fastening a rail to an iron support as claimed in claim 2, the said intermediate layers consisting of a cellulose product obtained under high pressure and containing about 80 per cent. of pure cellulose and about 20 per cent. of a binding and water-repelling filler.

In testimony whereof I have signed my name to this specification.

CARL LÖSSL.